United States Patent [19]

Deckert

[11] 4,260,026
[45] Apr. 7, 1981

[54] SPRINKLER GRASS TRIMMING TOOL

[76] Inventor: Dale I. Deckert, 4087 Lake Conway Woods Blvd., Orlando, Fla. 32806

[21] Appl. No.: 39,799

[22] Filed: May 17, 1979

[51] Int. Cl.³ .................. A01B 1/00; A01G 3/06; B26B 3/04
[52] U.S. Cl. .................................. 172/25; 30/302
[58] Field of Search .................. 172/13, 14, 15, 18, 172/19, 25, 371, 381; 30/300, 301, 302, 310, 316; 239/201; 248/214; 294/50.7

[56] References Cited

U.S. PATENT DOCUMENTS

| 1,480,151 | 1/1924 | Cosman | 172/19 X |
|---|---|---|---|
| 2,263,531 | 11/1941 | Kevorkian | 30/316 X |
| 3,062,299 | 11/1962 | Koepfinger | 30/316 |
| 3,127,939 | 4/1964 | Rink | 30/316 |
| 3,657,814 | 4/1972 | Bohlman | 30/302 |
| 3,747,214 | 7/1973 | Bohlman | 30/300 |
| 4,059,248 | 11/1977 | Kuntz | 248/214 |
| 4,122,905 | 10/1978 | Kanigan | 172/381 X |
| 4,149,693 | 4/1979 | Lo Nigro | 248/214 X |
| 4,209,903 | 7/1980 | Owens | 30/302 |

Primary Examiner—Richard T. Stouffer
Attorney, Agent, or Firm—Duckworth, Hobby, Allen, Dyer & Pettis

[57] ABSTRACT

A tool for trimming grass and roots from around sprinkler installations includes a shaft with a pair of outwardly extending struts and a cutting member formed of a generally circular plate fixed to the struts, the lower extremity of the plate forming a cutting blade. A plurality of trimming blades is removably fixed to the inner periphery of the angular plate approximately one inch from the bottom of the cutting blade, and extends away from the inner periphery of the plate so as to permit use of the trimming blades when the area around the sprinkler is overgrown with roots, but further permitting removal of the trimming blade when an annular cut around the sprinkler installation is sufficient to remove the undesirable growth.

12 Claims, 3 Drawing Figures

U.S. Patent        Apr. 7, 1981        4,260,026
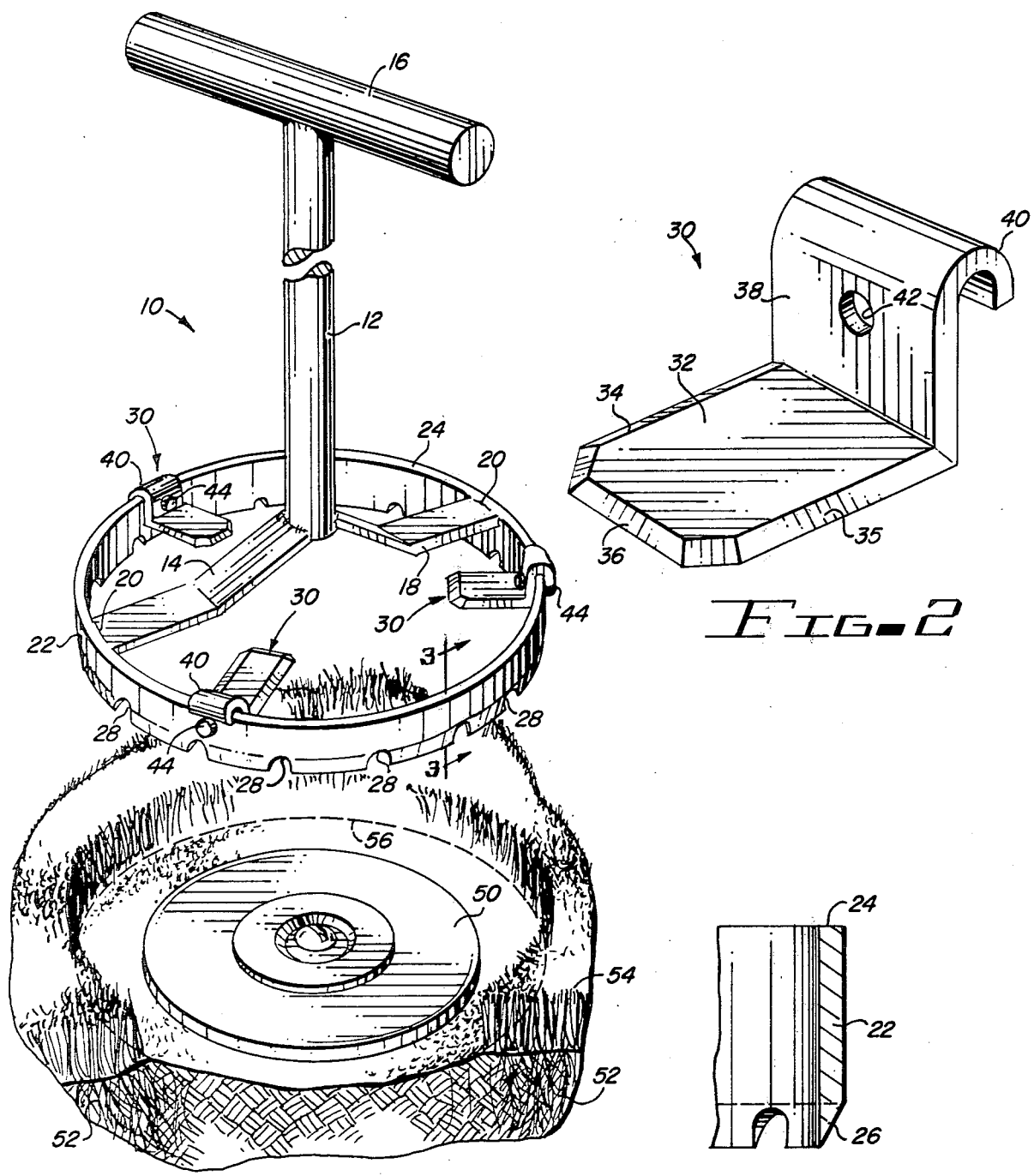

4,260,026

SPRINKLER GRASS TRIMMING TOOL

BACKGROUND OF THE INVENTION

1. Field of the Invention

The present invention relates to garden tools, and in particular relates to tools which are designed to trim grass, roots and other undesirable growth from around sprinkler installations.

2. Description of the Prior Art

One great American pastime involves the maintenance of well nourished and manicured grass lawns not only for asthetic purposes, but to secure a healthy environment as well.

One of the problems associated with the maintenance of grass lawns is providing sufficient water to keep the lawn well nourished. Conventional techniques for watering lawns includes portable water hoses which may be moved across the top of the lawn and taken up again after the watering is completed. The disadvantage associated with garden hoses is the requirement of excessive handling of the hose, which frequently results in the lawn going unwatered.

A solution to the problems associated with portable garden hoses is the installation of a permanent, in situ, sprinkling system. Typically, sprinkler systems of this type employ various tubing which feeds spaced sprinkler heads positioned at ground level. Upon the application of sufficient water pressure through the underground tubing, each sprinkler head rises above the ground level and begins the sprinkler action to nourish the lawn in the desired manner.

The disadvantage associated with the sprinkler system results from the very nourishment which the system provides; that is, as the grass is nourished, it tends to send out roots, runners and otherwise grow into the area surrounding the sprinkler head. If not properly maintained, the grass can overrun the sprinkler head installation, and prevent its proper function, It is known in the prior art to employ conventional garden shears, scissors and the like to cut back the root and grass runners to provide a space between the edge of the grass and the sprinkler head. However, this technique is rather laborious and time consuming.

To solve the problems described above, there has been developed in the prior art numerous tools designed specifically for cutting the grass back a safe distance from the sprinkler head installation.

In U.S. Pat. No. 3,657,814 (Bohlman) discloses a tool arrangement of this type comprising an inner tubular member and a larger outer tubular member coaxial therewith with a plurality of inclined blades between the two tubular members.

Baker, in U.S. Pat. No. 2,882,600 discloses a grass trimming tube likewise employing a pair of concentric cylindrical members.

Rousselt discloses, in U.S. Pat. No. 3,174,224, an electric motor-driven grass trimmer, in which the blade comes in contact with the grass surrounding the sprinkler head by axial movement of the electrical motor and supporting shaft downward toward the sprinkler head installation.

Hatfield teaches, in U.S. Pat No. 3,743,027, another concentric cylindrical blade arrangement having a mechanism between two blades for expelling the dirt and cut grass downwardly away from the blade.

A simple hand tool for performing this function is disclosed by Simonsen in U.S. Pat. No. 2,733,100, a similar arrangement is disclosed by Carr in U.S. Pat. No. 2,809,864.

In U.S. Pat. Nos. 358,792 to Simpson and 2,262,531 to Kevorkian, there is disclosed fruit pulling tools employing a permanently fixed blade extending from the inner periphery of the cutting tool.

SUMMARY OF THE INVENTION

The present invention contemplates a tool for trimming grass and roots from around sprinkler installations, and comprises a shaft having a pair of outwardly extending struts. A cutting member formed of a generally annular plate is fixed to the struts, the lower extremity of the plate forming a cutting blade. A plurality of trimming blades is fixed to the inner periphery of the annular plate and extends away from the periphery thereof.

The tool further includes means for removably joining the trimming blades to the plate.

In accordance with the preferred embodiment of the present invention, the plate further includes a plurality of spaced indentations about the cutting blade, so as to permit a tearing action for roots and the like engaged by the cutting blade during use of the tool. Preferably, the trimming blades are removably positioned against the inner periphery of the annular plate so as to permit the trimming blades to be removed when not required, as for example when the amount of vegetation around the particular sprinkler head installation only includes surface growth, and does not include thick runners or roots of the type which would usually be found after a long period of time between trimmings.

Suitably, each trimming blade comprises a length of flat stock material having a hook on one end for engaging the edge of the plate opposite the cutting blade, and a removable fastener is provided so as to hold the blade against the inside periphery of the plate; by way of example, a machine bolt is suitable for use as the fastener in accordance with the present invention. Each trimming blade is positioned a distance from the bottom cutting edge of the plate, and comprises a flat side lying flush with the inner periphery of the plate. By experimentation, it has been determined that spacing of the trimming blades about one inch above the bottom of the cutting blades results in an optimum trimming action of grass runners along the top of the soil.

THE DRAWING

FIG. 1 is a perspective view illustrating the tool of the present invention, and the manner in which the tool is employed.

FIG. 2 is a perspective illustrating a portion of the tool shown in FIG. 1.

FIG. 3 illustrates a cross section of FIG. 1, taken along lines 3—3.

DETAILED DESCRIPTION

A preferred embodiment of the trimming tool in accordance with the present invention is shown in FIGS. 1, 2 and 3 and described with reference thereto.

Noting FIG. 1, the tool, referred to generally by the reference numeral 10, includes a shaft formed of a tube 12, which is joined to a cross-tube on the upper extremity extending normal to the direction of the shaft to form a handle. The other end of each tube 12 is coupled to a pair of struts 14, 18 which are joined to a cylindrical cutting plate 22 at points 20 by way of a weld or similar fastening means.

The lower, distal extremity of the cutting plate 22 is sharpened to a cutting edge 26 extending substantially axial with respect to the direction of the shaft formed by the tube 12, 14. A cross section of the cutting plate 22 and its associated cutting edge 26 is shown in FIG. 3.

The cutting plate 22 further includes a plurality of equidistantly spaced indentations 28 around the periphery of the cutting blade 26, to form the cutting blade with a series of "teeth" between adjacent indentations. Cutting blade 22 further includes a plurality of trimming blades 30 fixed to the inner periphery of the plate and extending away from the periphery toward the central axis of the shaft formed by the tubes 12, 14.

As shown in FIG. 2, each trimming blade 30 is formed of a flat metal stock 32 having a hook 40 on one end thereof extending from a flat side 38 which remains flush with the inner periphery of the plate 22. The blade 30 includes a hole 42 therein adapted to receive a fastener 44 (FIG. 1) extending through the plate 22 and in engagement with the trimming blade 30. The blade 30 further includes sharpened sides 34, 35 and distal extremity 36.

Reference is again made to FIG. 1. In use, the tool 10 is held in the hand of the operator by the handle 16. The tool is brought in proximity to the area of the sprinkler head installation, shown by reference numerial 40 in FIG 1. Any excess vegtation growing into the area surrounding the sprinkler head 50, including roots 52 and grass leaves 54 are to be cut back to a circular line depicted by the dotted line 56. This is accomplished by bringing the cutting blade into engagement with the surface surrounding the sprinkler head 50, and then axially rotating the cutting plate 22 by appropriate movement of the handle 16, preferrably in a reciprocal fashion. As the cutting blade 26 passes down through the surface of the soil, the trimming blades 30 come into engagement with the roots 52 and the vegetation extending above the ground 54, cutting that vegetation from around the sprinkler head 50 in the desired manner. The area from which the vegetation has been removed may then be filled with sand to inhibit further growth. Use of the trimming blade 30 is particularly appropriate where there has been a significant amount of time between the last trim around the sprinkler head installation system and the trimming operation underway. However, if there has not been a significant amount of root growth into the area within the peripheral line 56, then the trim blades 30 may removed and the area easily maintained by use of the cutting plate 22 alone.

Preferably, all of the parts of the tool 10 are zinc coated. Alternatively, the handle, shaft, struts and the top of the cutting blade may be formed of plastic, to reduce weight and costs.

I claim:

1. A tool for trimming grass and roots from around sprinkler installations comprising:
   a shaft having a pair of outwardly extending struts;
   a cutting member formed of a generally annular plate fixed to said struts, said annular plate having a lower edge and an upper edge and a central longitudinal axis, the lower edge of said plate forming a cutting blade;
   a plurality of trimming blades fixed to the inner periphery of said plate and extending inwardly from the inner periphery thereof, each said trimming blade comprising a length of flat stock material having a hook on one end engaging the upper edge of said plate opposite said cutting blade, each said flat stock blade having sharpened sides and a sharpened distal end, the portion of said flat stock blade extending from said hook to said distal end being substantially planar, the plane of said blade being substantially normal to said longitudinal axis of said annular plate; and
   means for removably joining said trimming blade to said plate.

2. The tool recited in claim 1 wherein said plate further includes a plurality of spaced indentations about said cutting blade.

3. The tool recited in claim 1 or 2 wherein said removable joining means comprises a removable fastener for holding said hook against the inner periphery of said plate.

4. The tool recited in claim 1 wherein each said trimming blade is positioned along the periphery of said plate about one half the distance between said blade and said edge.

5. The tool recited in claim 1 or 4 wherein said plate and said trimming blade comprise zinc.

6. The tool recited in claim 1 wherein said hook of each trimming blade further comprises a flat side lying flush with the inner periphery of said plate.

7. The tool recited in claim 6 wherein said removable joining means comprises:
   a plurality of removable fasteners, each fastener securing a corresponding one of said trimming blades to said plate; and
   a hole in each said flat side for receiving one of said fasteners.

8. The tool recited in claim 1 or 7 wherein said cutting blade is substantially axial with said shaft.

9. The tool recited in claim 1 wherein said trimming blades are spaced from the bottom of said cutting blade about one inch.

10. A tool for trimming grass and roots from around sprinkler installations comprising:
    a shaft formed of a tube having a cross-tube on one end to form a handle extending substantially normal to said shaft and a pair of spaced struts at the other end;
    a generally cylindrical cutting plate, said plate fixed to said struts and having a distal extremity away from said handle sharpened to form a cutting edge substantially axial with said shaft;
    a plurality of spaced, removable trimming blades fixed to the inner periphery of said plate at a point spaced from said cutting edge, each trimming blade formed of a flat stock including a substantially planar blade portion lying substantially parallel with a plane normal to the direction of said shaft;
    each said trimming blade formed of a hook for engaging said plate on one end thereof, and a free end on the other end thereof, said substantially planar plate portion extending inwardly from said inner periphery of said cutting plate to said free end; and
    removable fastening means for joining the hook of each said trimming blade to said plate.

11. The tool recited in claim 1 or 10 wherein said trimming blades are radial to the axial direction of said shaft.

12. The tool recited in claim 10 wherein said hook comprises a flat side flush with the inner periphery of said plate and a hole in said flat side for receiving said fastening means.

\* \* \* \* \*